Figure 6:
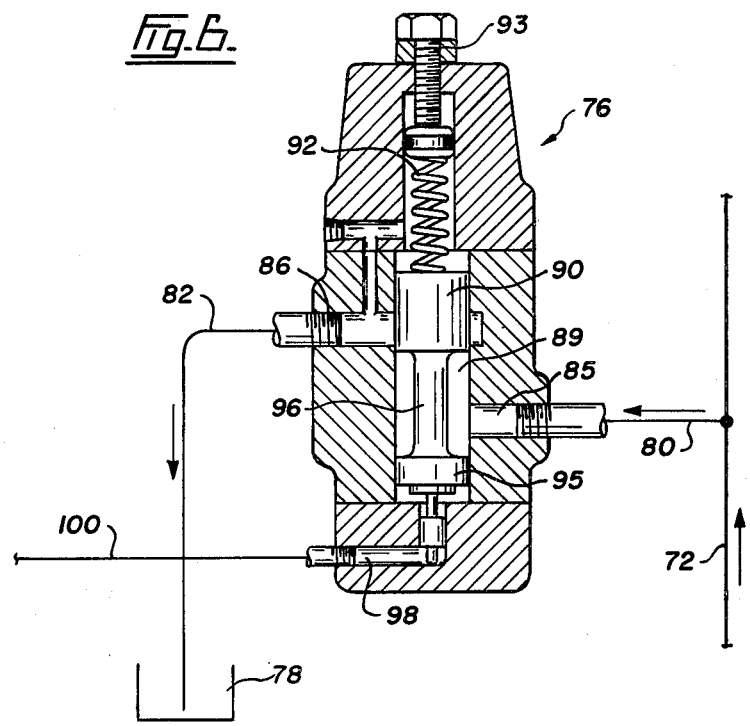

United States Patent [19]

Eaton

[11] 4,368,763

[45] Jan. 18, 1983

[54] APPARATUS FOR CONTROLLED CUTTING DOWN OF TREES

[76] Inventor: George H. Eaton, 1115 Sutton Pl., West Vancouver, British Columbia, Canada, V7S 2L3

[21] Appl. No.: 224,708

[22] Filed: Jan. 12, 1981

[51] Int. Cl.³ .............................................. A01G 23/08
[52] U.S. Cl. .................................... 144/34 R; 91/520; 144/3 D
[58] Field of Search ............... 83/928; 144/3 D, 34 R, 144/34 E, 309 AC; 91/520, 526, 531; 60/484

[56] References Cited

U.S. PATENT DOCUMENTS 3,874,432  4/1975  Albright ........................... 144/34 R

FOREIGN PATENT DOCUMENTS

| 631116 | 11/1978 | U.S.S.R. | 144/34 R |
| 646954 | 2/1979 | U.S.S.R. | 144/34 R |
| 655362 | 4/1979 | U.S.S.R. | 144/34 R |
| 665860 | 6/1979 | U.S.S.R. | 144/34 R |

Primary Examiner—W. D. Bray
Attorney, Agent, or Firm—Townsend and Townsend

[57] ABSTRACT

Cutting apparatus having a chain saw operated by a hydraulic motor as it is simultaneously moved towards an anvil by a hydraulic cylinder in a scissor cutting action. A valve is connected to the pressure line of the hydraulic cylinder to divert hydraulic fluid from said line to control the energization of the cylinder in accordance with the load put on the motor by the saw chain. This valve includes operating means to control the flow of fluid therethrough from zero to sufficient to stop the hydraulic cylinder. A line extends from the pressure line of the hydraulic motor to the valve operating means to increase and decrease the fluid flow through the valve respectively in accordance with increases and decreases of the pressure in the feed line of the motor inversely to control the pressure in the feed line of the cylinder.

3 Claims, 6 Drawing Figures

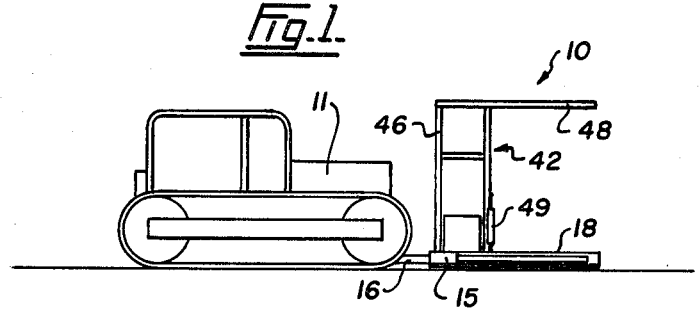
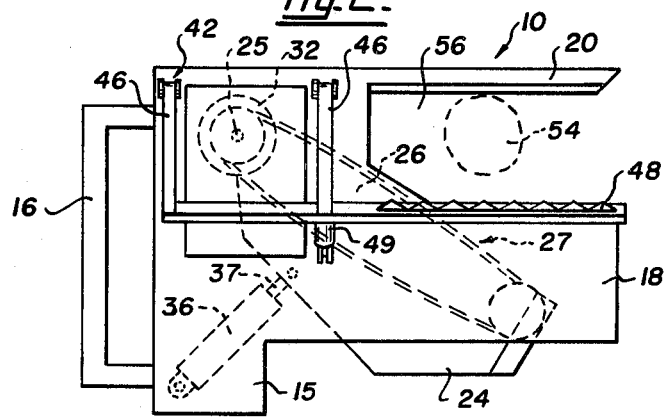
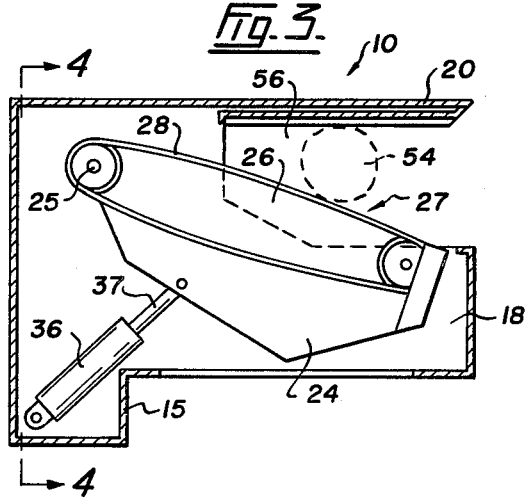
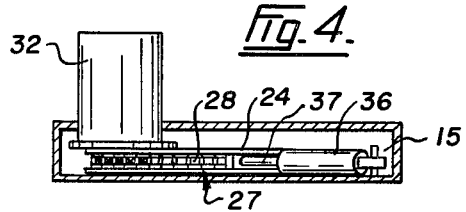

APPARATUS FOR CONTROLLED CUTTING DOWN OF TREES

This invention relates to apparatus for cutting down trees in a controlled manner.

The actual cutter of the present apparatus is similar to that illustrated in Canadian Pat. No. 949,853, dated June 25, 1974. The patented apparatus includes a hydraulic motor for operating a chain saw on a swingably-mounted cutter bar. It also includes a hydraulic cylinder for moving the chain saw towards an anvil to cut a tree positioned between these elements. The patent discloses a relatively complex mechanism for controlling the pressure fluid directed to the cylinder in accordance with the pressure of the pressure fluid directed to the hydraulic motor during a cutting operation. The idea is to reduce the feeding action of the hydraulic cylinder when the saw motor is subjected to overload by resistance to the cutting action of the chain saw. The main disadvantage of the patented apparatus is that all of the hydraulic fluid being directed to the feed cylinder passes through a restricted orifice of a flow control device resulting in considerable heat being generated. A spring-loaded piston and mechanical linkage are used to cause rotation of a directional element in the flow control device. The spring is a source of weakness in the system, as is the mechanical linkage. Changes in the viscosity of the hydraulic fluid resulting from temperature changes affects the operation of the control mechanism. As a result of this, frequent manual adjustment is required to cause the control to function properly. For example, if the apparatus is set up to function properly on a cold morning, mid-day heat may so reduce the viscosity of the fluid that the hydraulic cylinder feeds the chain saw too fast into the tree being cut. To overcome this, the operator has to adjust the system to restore the proper control. This action is reversed if the apparatus is set for proper operation during the heat of the day, a cooling off of the air causes an increase in the viscosity of the fluid so that the chain saw is not fed fast enough towards the tree.

It is a main purpose of the present invention to eliminate the above-noted disadvantages in tree cutting apparatus similar to that disclosed in patent No. 949,853. Instead of the spring-loaded piston, mechanical linkage and flow-restriction orifice of the patented apparatus, the apparatus of this invention includes a valve connected to the pressure line of the hydraulic cylinder and which is operable to divert hydraulic fluid from said feed line in accordance with the load on the hydraulic motor of the chain saw. The valve includes control means connected to the pressure line of the hydraulic motor. When the pressure of the motor fluid is increased beyond a predetermined level, this pressure operates the control means of the valve to cause the valve to open and allow some of the pressure fluid of the cylinder to by-pass that cylinder, thereby decreasing the feed rate of the cylinder. The valve is capable of diverting or by-passing the hydraulic fluid from zero to sufficient to stop the operation of the hydraulic cylinder. The valve accomplishes this without restricting the flow of fluid through the hydraulic system of the cylinder.

As a result, there is no interference in the present apparatus to the flow of oil to the feed cylinder, and there is no heat generated by the control system in the hydraulic circuit of this cylinder. The only possible generation of heat is in the oil being by-passed and this is very limited, and in any case this oil is directed back to the tank. The operation of the feed cylinder is not subject to changes of viscosity of the operating fluid of the feed cylinder and, therefore, the present apparatus functions in a constant manner. It is insensitive to changes in the ambient temperature, and as a result no adjustment is needed once the apparatus is set up for operation.

Apparatus according to this invention comprises a base having an elongated anvil projecting therefrom, a cutter bar on the base opposed to the anvil and mounted for movement towards and away from said anvil, a saw chain operatively mounted on the cutter bar for cutting action thereon, a hydraulic motor carried by the base and operatively connected to the saw chain to move said chain in the cutting action, a first hydraulic circuit comprising said motor, a pump and a first pressure line between the pump and the motor, a hydraulic cylinder connected between the base and the cutter bar for moving said bar forward towards the anvil during the cutting action of the saw chain and away from the anvil, a second hydraulic circuit comprising said cylinder, a pump and a second pressure line between the cylinder and the pump, a by-pass valve separate from said second pressure line and connected thereto and operable during movement of the cutter bar and saw chain towards the anvil to selectively direct hydraulic fluid from the second circuit, without restricting the flow of fluid through said second circuit, operating means for the valve to control the flow of fluid from the second pressure line between zero and sufficient to stop the hydraulic cylinder, and a third line from the first pressure line to said valve operating means to increase and decrease the flow of fluid through the by-pass valve in accordance with increases and decreases respectively in the pressure of fluid in said first line to control the pressure inversely in the feed line of the cylinder, whereby the rate of movement of the cutter bar with the saw chain is controlled by the load on the saw chain during the cutting action thereof.

Figure 5:
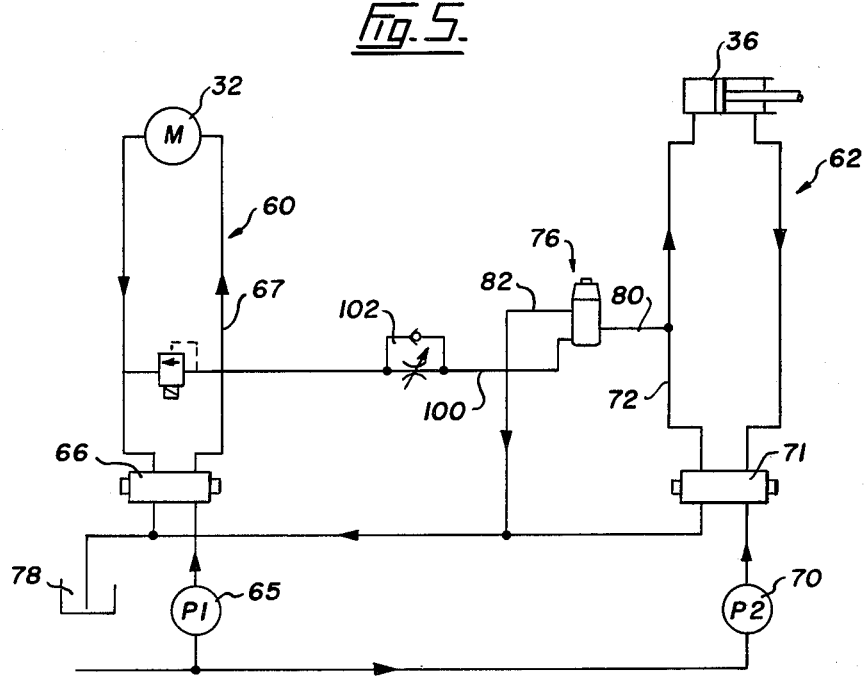

A preferred form of this invention is illustrated in the accompanying drawings, in which:

FIG. 1 is a diagrammatic side elevation of the present apparatus attached to a traction unit, FIG. 2 is a slightly enlarged plan view of the cutting apparatus showing the chain saw in the retracted or non-cutting position, FIG. 3 is a view similar to FIG. 2, showing the chain saw in a cutting position, FIG. 4 is a cross section taken on the line 4—4 of FIG. 3, FIG. 5 diagrammatically illustrates the hydraulic system of this tree cutter, and FIG. 6 is an enlarged view of the by-pass valve of this hydraulic system.

Referring to the drawings, 10 is a tree cutting apparatus in accordance with this invention mounted on the front end of a traction unit 11 and carried thereby. This traction unit may be any type of tractor or the like having a hydraulic system with the usual controls and which may be used to supply hydraulic fluid to apparatus 10. The controls for the hydraulic systems of apparatus 10 may be located on said apparatus, in which case a person on the apparatus or standing by it would control its operation. On the other hand, the controls of the cutting apparatus may be mounted on the traction unit so that the cutter apparatus can be operated by the operator of the unit.

The cutting apparatus 10 includes a base 15 which is connected to the front end of tractor unit 11 in any suitable manner, such as by mounting bars 16. Base 15 includes a housing 18 projecting outwardly therefrom, and an elongate anvil 20 extending from the base substantially parallel with housing. A frame 24 is swingably mounted near an inner end thereof on a mounting pin 25 and is movable between a position within housing 18 towards and away from anvil 20. This frame carries the cutter bar 26 of a chain saw 27, said saw including a saw chain 28 mounted for movement around the elongate cutter bar. A hydraulic motor 32 is mounted on base 15 and is operatively connected to a sprocket, not shown, of the chain saw, the chain 28 of said saw being driven by the motor. As the chain saw 27 is a standard unit, it does not require any further description herein.

A hydraulic cylinder 36 is mounted at one end thereof on base 15, and its piston rod 37 is connected to frame 24 near the pivot pin 25. This cylinder can be energized to draw frame 24 and chain saw 27 into housing 18 and to move these elements towards and away from anvil 20.

Apparatus 10 may be provided with a pusher unit 42 to bear against a tree being cut to cause the tree to fall in a desired direction. This pusher unit comprises vertical arms 46 pivotally mounted at lower ends thereof on base 15, and a transverse bar 48 is connected to upper ends of these arms and extends horizontally above the base. A hydraulic cylinder 49 is connected to one of the arms 46 and to the base, said cylinder being operable to swing the bar 48 around the pivots at the lower ends of arms 46. The cylinder 49 is part of a hydraulic system fed by hydraulic fluid from the tractor unit and having the usual pump and controls. As such a hydraulic system is well known it does not require a description herein.

When the cutter apparatus 10 is in use, it is moved by traction unit 11 to the tree to be cut. The apparatus is moved until the tree 54 enters the gap 56 in base 15 between housing 18 and anvil 20. Frame 24 and cutter bar 26 are retracted in housing 18 at this time. Motor 32 is energized to cause chain 28 to move around cutter bar 26, and cylinder 36 is energized to swing frame 24 outwardly from housing 18 until the saw chain 28 engages the tree and starts to cut into it.

At this time, anvil 20 is drawn against the side of the tree opposite to the side being cut. The saw chain cuts through the tree in the usual manner, and as the saw approaches the end of the cut, cylinder 49 is energized to swing bar 48 against the tree above the cut to press the tree laterally relative to apparatus 10.

FIGS. 5 and 6 illustrate the hydraulic circuits 60 and 62 of motor 32 and cylinder 36, respectively. The motor circuit 60 includes a pump 65 driven by the motor, not shown, of traction unit 11, a standard control valve 66 and a pressure line 67 leading to the motor. The cylinder circuit 62 includes a pump 70 driven by the traction unit engine, a standard control valve 71 and a pressure line 72 extending to an end of cylinder 36. When hydraulic fluid under pressure is directed into this end of the cylinder, the piston thereof is moved in the direction to swing frame 24 and its chain saw 27 outwardly towards anvil 20.

A by-pass valve 76 is provided between pressure line 72 of the cylinder circuit 62 and a tank 78 of the hydraulic system to selectively divert hydraulic fluid from this pressure line to the tank without restricting the flow of the fluid in circuit 62. An inlet line 80 extends from valve 76 to pressure line 72, and an outlet line 82 extends from said valve to the return lines leading to tank 78.

By referring to FIG. 6, it will be seen that valve 76 has a passageway extending from an inlet 85 to an outlet 86. This passageway includes a cylindrical bore 89 in which a spool 90 is slidably mounted. This spool is normally biased to a position closing the valve passageway by a spring 92, the pressure of which is adjusted by turning a bolt 93 projecting from an end of the valve. A piston 95 is slidable in bore 89 and is connected to spool 90 by a stem 96.

Operating means is provided for valve 76. This operating means includes the piston 95 and an inlet passage 98 extending to an end of bore 89. A hydraulic line 100 extends from the valve inlet passage 98 to the pressure line 67 of the motor hydraulic circuit 60. A variable directional flow control valve 102 is provided in line 100.

During operation of the apparatus 10, valve 76 can control the by-passing of fluid from pressure line 72 of the cylinder circuit 62 to tank between zero and sufficient to stop the energizing of cylinder 36 and thereby stop the movement of the chain saw towards the cutter bar. As previously stated, motor 32 operated chain saw 27, and cylinder 36 swings the chain saw towards the anvil 20 during a cutting operation. The chain saw cuts into the tree 54 located between the saw and the anvil. If the chain saw encounters increased resistance during the cutting action, motor 32 is slowed down and the pressure of the hydraulic fluid in line 67 increases. This increase of pressure is transferred by line 100 to the underside of piston 95 of valve 76 to shift spool 90 to allow an increase in the by-passing of fluid from line 72 of circuit 62 through the passage of the valve to the tank. This slows down the movement of the chain saw into the tree by cylinder 36. As the resistance to the chain saw lessens, the pressure in line 67 drops and the spool valve moves downwardly to reduce or stop the flow through the valve passage. Usually valve 76 and/or control valve 102 are adjusted to permit a by-passing of some of the pressure fluid of circuit 62 when the cutting conditions are ideal. At this time, there is a balance between the pressure fluids in the circuits 60 and 62, and when this balance is upset, the amount of fluid by-passed is increased or decreased to slow or speed up the feed action of cylinder 36.

With this hydraulic system, the pressure of the fluid in line 72 of the hydraulic cylinder is controlled inversely relative to the pressure of the fluid in line 67 of the chain saw motor. This is accomplished without restricting the flow of fluid through the cylinder pressure line 72. As a result of this, the operation of the hydraulic system is not affected by changes in the ambient temperature. Once the control valves have been set, it is not necessary to change them unless it is desired to increase or decrease the cutting rate of the chain saw.

I claim:

1. Apparatus for cutting down trees in a controlled manner, comprising:

a base having an elongate anvil projecting therefrom, a cutter bar on the base opposed to the anvil and mounted for movement towards and away from said anvil, a saw chain operatively mounted on the cutter bar for cutting action thereon, a hydraulic motor carried by the base and operatively connected to the saw chain to move said chain in the cutting action, a first hydraulic circuit comprising said motor, a pump and a first pressure line between the pump and the motor, a hydraulic cylinder connected between the base and the cutter bar for moving said bar forward towards the anvil during the cutting action of the saw chain and away from the anvil, a second hydraulic circuit comprising said cylinder, a pump and a second pressure line between the cylinder and the pump, a by-pass valve separate from said second pressure line and connected thereto and operable during movement of the cutter bar and saw chain towards the anvil to selectively direct hydrauic fluid from the second circuit without restricting the flow of fluid through said second circuit, operating means for the valve to control the flow of fluid from the second pressure line between zero and sufficient to stop the hydraulic cylinder, and a third line from the first pressure line to said valve operating means to increase and decrease the flow of fluid through the by-pass valve in accordance with increases and decreases respectively in the pressure of fluid in said first line to control the pressure inversely in the feed line of the cylinder, whereby the rate of movement of the cutter bar with the saw chain is controlled by the load on the saw chain during the cutting action thereof.

2. Apparatus as claimed in claim 1 in which said valve comprises a passageway extending from an inlet to an outlet, said inlet being connected to the second pressure line, and a spool slidably in the valve to close said passageway and movable to open the passageway to varying degrees, said operating means being connected to the spool to increase and decrease the flow through the passageway in accordance with pressure increases and decreases in the fluid in the first line.

3. Apparatus as claimed in claim 2 in which said operating means comprises a piston slidable in the passageway and aligned with the spool, a stem extending between and connected to the spool and the piston, and an inlet passage in the valve and opening towards said piston on the side thereof remote from the stem, said third line being connected to the inlet passage so as to expose the piston to the pressure of the fluid in the first pressure line.

* * * * *